Sept. 9, 1947.        W. F. MOORE        2,427,152
GAGE TO TEST THE PERPENDICULARITY OF THE FACE
OF A WORKPIECE TO ITS AXIS
Filed Nov. 14, 1944

Inventor
Willis F. Moore

Patented Sept. 9, 1947

2,427,152

UNITED STATES PATENT OFFICE 2,427,152

GAGE TO TEST THE PERPENDICULARITY OF THE FACE OF A WORKPIECE TO ITS AXIS

Willis F. Moore, Springfield, Vt., assignor to Bryant Chucking Grinder Company, Springfield, Vt., a corporation of Vermont Application November 14, 1944, Serial No. 563,326

9 Claims. (Cl. 33—199)

This invention relates to work gages and has for an object to provide a gage by which a work face which is intended to be perpendicular to the axis of a threaded or peripherally grooved portion of the work piece may be tested for accuracy of such relationship. This is done by engaging the grooved or threaded portion of the work piece by a mating portion of the gage, engaging the face to be gaged at angularly spaced points by a pair of feeler elements, one of which is yieldable and is in operative relation to an indicator, and then, while the feeler elements are in contact with the work face, turning the work piece about the axis of its threaded or grooved portion. Any inaccuracy of such relationship will then be shown by a variation in the reading of the indicator as the work piece is turned.

For a more complete understanding of this invention, reference may be had to the accompanying drawings in which Figures 1, 2 and 3 are top plan, side, and end elevational views, respectively, of a gage for internally threaded work and embodying the invention, work being shown in section in Figure 2 and in full lines in Figures 1 and 3.

Figure 1:
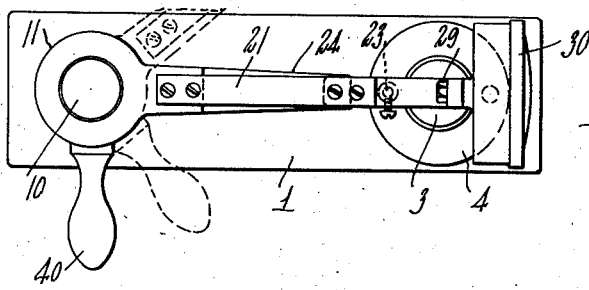
Figure 2:
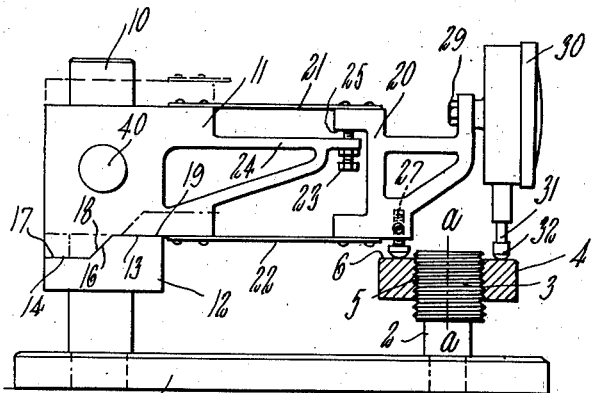
Figure 3:
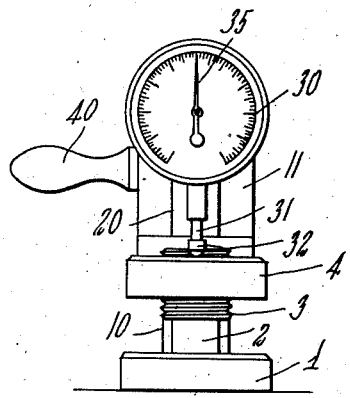
Figure 4:
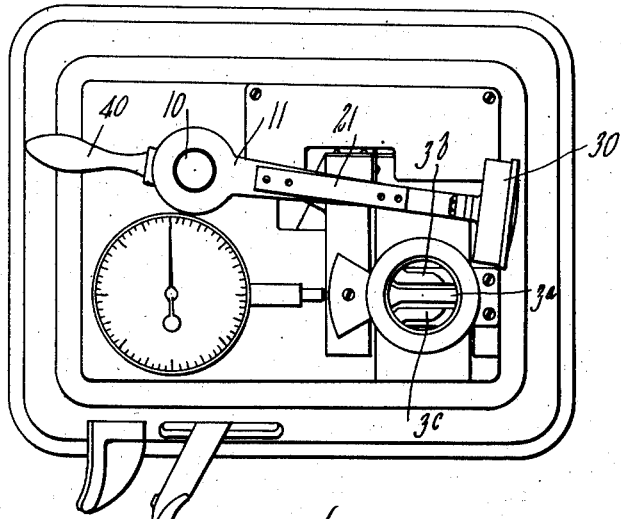
Figure 4 is a top plan view of a gage slightly modified from the construction of Figures 1 and 2 as applied to a thread gage of the type shown in my Patent No. 2,363,077 and using the gaging anvils thereof to support the work piece.

Referring first to Figures 1, 2 and 3, at 1 is indicated a support. Carried by this support is a member 2 upstanding therefrom and provided with a surface portion 3 formed to support a work piece 4 which is internally threaded as at 5. The portion 3 of the member 2 engages with the internal threads of the work piece 4 and thus support the work piece so that it can be turned about the axis a—a of the member 2. The work piece has a face 6 which is intended to be perpendicular to the axis a—a and the purpose of the present invention is to determine the accuracy of such relationship.

Spaced from the member 2 is an upstanding post 10 also carried by the support 1 and mounted to swing thereon is an arm 11. This arm 11 is supported spaced above the support 1 to the desired distance by a collar 12 which as shown is provided with a cam top face having a high portion 13 and a low portion 14 joined to the high portion by an inclined surface 16. The arm 11 has a lower face complementally formed, being provided with a face 17, which when it engages the face 14 of the collar, brings an inclined face 18 in contact with an inclined face 16 of the collar and a face 19 in contact with the collar face 13. In this angular position the arm is in its downward limit of motion, but it is clear that by rocking the arm about the axis of the post 10, the arm will be lifted until the portion 17 of the arm rides on the high portion 19 of the collar. This will bring the upper face of the arm 11 into the dotted line position shown in Figure 2.

Connected to the arm 11 by a parallel motion device is a member 20. As shown the parallel motion device comprises a pair of leaf springs 21 and 22, each secured at one end to the arm 11 and at the opposite end to upper and lower faces of the member 20. The member 20 may thus be given an up and down motion parallel to the up and down motion of the arm 11, and the downward limit of this motion with respect to the arm 11 may be adjustably determined by a stop screw 23 threaded through an extension 24 of the arm and in position to be contacted by a face 25 of the member 20. Fixed to the member 20 is an anvil 27 which may rest upon the face 6 of the work piece 4. The member 20 has secured thereto spaced from the anvil 6, as by the screw 29, a position indicator 30. This indicator is provided with a movable stem 31 equipped at its lower end with an anvil 32 positioned to engage the face 6 of the work piece spaced substantially from the fixed anvil 27, and as shown substantially diametrically opposite thereto. When the anvils 27 and 32 are in engagement with the work, the arm 11 is in the angular relation shown in Figure 2 where it is in its lowest limit of motion in which the anvils 27 and 32 are in engagement with the face 6 of the work. By turning the work 4 about the axis a, a, the work piece is also moved lengthwise of this axis, but the parts are so arranged that during this motion for gaging purposes, the springs 21 and 22 will hold the anvils 27 and 32 against the face 6, moving up or down with the work piece as it moves axially. The anvil 27 engaging the face 6 of the work piece determines the vertical position of the member 20, and consequently of the indicator 30, but variations from perpendicular of the work face 6 to the axis a, a, will be evidenced by vertical motion of the anvil 32 with reference to the indicator as the work piece is turned about the axis a, a, this motion being indicated by variations in the position of the indicator pointer 35.

When it is desired to remove a work piece or to put a work piece in position for the gaging action, the arm 11 is turned about the post 10 which lifts the elements 27 and 32 from their normal position and turns the gaging anvils 27 and 32 laterally out of registry with the work piece which can thus be removed and replaced by another work piece. To facilitate this, the arm 11 may be provided with a handle 40 which may be grasped by the operator.

It is, of course, evident that where the peripheral grooves of the work are not threads, but are continuous circular grooves, there will be no axial motion of the work as it is being turned and it will also be necessary to make the member 2 collapsible so that the work piece can be placed on or removed therefrom. For example, when gaging internal threads or grooves the member 2 may comprise three portions 3a, 3b and 3c which as shown are the relatively movable anvils of an internal gage such as is shown in my Patent No. 2,363,077, granted November 21, 1944, for Work gage. The anvil portions 3a, 3b and 3c are used for the present invention merely as a holder for the work whether threaded or otherwise peripherally grooved. The gage of the present invention is then supported directly on the casing of the gage shown in the patent, the supporting post 10 for the arm 11 extending upwardly from the top face of the gage casing and the indicator 30 being movable from and toward a position above the work support comprising the three anvils 3a, 3b and 3c.

Figure 5:
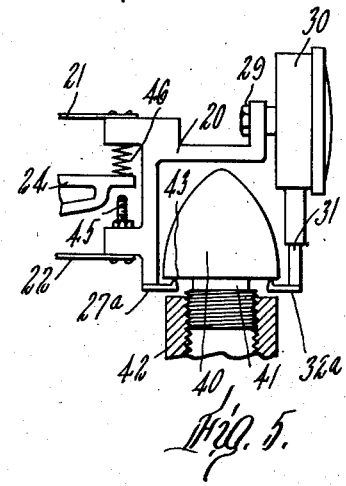
Figure 5 is a view similar to a portion of Figure 2, but showing a gage for externally threaded work.

In Figure 5 a modification is shown in which the work is externally rather than internally threaded. Thus the work piece 40 is provided with a shank portion 41 externally threaded as shown, which may be rotatably supported in an internally threaded member 42 which may be substituted for the member 3 in the construction of Figures 1 to 4. This work piece 40 has a face 43 which should be perpendicular to the axis of the threaded shank 41. The member 20 to which the indicator 30 is attached is then provided with a fixed gaging anvil 27a which is adapted to engage the face 43, while the shank 31 of the indicator is provided with an anvil 32a also adapted to engage the face 43 of the work. With this arrangement the biasing afforded by the parallel motion 21—22 is upward, the upper limit of motion of the member 20 with respect to the arm extension 24 being determined by an adjustable screw 45, and if desired, a coil spring 46 may be employed located between the arm extension 24 and the upper portion of the member 20 tending to lift the member 20. This may be in addition to the biasing action of the springs 21, or in opposition thereto and sufficiently powerful to overcome the biasing action thereof in case their action tends to depress the member 20 rather than lift it, as in the construction of Figures 1 to 4. Here again, rotation of the work piece about the axis of its threaded shank which causes an axial motion of the work piece, will move the member 20 accordingly by engagement of the fixed anvil 27a thereon, while any inaccuracy in the right angle relationship between the face 43 and the shank axis will be shown by relative motion of the anvil 32a and the indicator 30 with consequent variation in the reading of the indicator pointer 35.

From the foregoing description of certain embodiments of this invention it will be understood that various other changes and modifications might be made without departing from the spirit or scope of this invention.

I claim:

1. A gage having means for supporting a work piece for rotation about an axis, a pair of anvils engageable at points angularly spaced about said axis with a face of the work at substantially right angles to said axis, said anvils being relatively movable substantially lengthwise of said axis, and means for indicating by said motion of one of said anvils relative to the other, variations from true right angular relationship between said work face and axis as said work piece is turned relative to said supporting means about said axis.

2. A device of the class described, comprising a member for engagement with peripheral grooves of a work piece and rotatable relative thereto about an axis, a support for said member, a second member mounted for motion on said support parallel to said axis toward and from said first-mentioned member, a pair of anvils carried by said second member for engagement at spaced points with a face of the work substantially at right angles to said axis, one of said anvils being fixed to said second member and the other of said anvils being movable substantially parallel to said axis relative to said second member, said second member being biased toward the work, and an indicator fixed to said second member and in operative relation to said movable anvil and indicating the position of said movable anvil with reference to said second member.

3. A device of the class described, comprising an upstanding member having parts for supporting engagement with peripheral grooves of a work piece, a support for said member, a post carried by said support spaced from said upstanding member, an arm carried on said post, a second member, parallel motion mechanism connecting said member to said arm for motion substantially parallel to the axis of said post, an anvil fixed to said second member and engageable with a face of a work piece, which work piece is supported by said upstanding member and which face is substantially perpendicular to the axis of said upstanding member, and an indicator carried by said second member and having a movable anvil engageable with said work piece spaced from said first-mentioned anvil.

4. A device of the class described, comprising an upstanding member having parts for supporting engagement with peripheral grooves of a work piece, a support for said member, a post carried by said support spaced from said upstanding member, an arm rockably carried on said post, a second member, parallel motion mechanism connecting said second member for motion substantially parallel to the axis of said post, an anvil fixed to said second member and engageable with a face of a work piece when said arm is in one angular position, which work piece is supported by said upstanding member and which face is substantially perpendicular to the axis of said upstanding member, an indicator carried by said second member and having a movable anvil engageable with said work face spaced from said first-mentioned anvil, and cooperating cam parts on said post and arm causing axial motion of said arm to bring said anvils away from said work piece as said arm is moved away from said angular position.

5. A device of the class described, comprising an upstanding member having parts for supporting engagement with peripheral grooves of a work piece, a support for said member, a post carried by said support spaced from said upstanding member, an arm carried on said post, a second member, a pair of parallel leaf springs connecting said arm and second member acting as a parallel motion mechanism connecting said member to said arm for motion substantially parallel to the axis of said post, an anvil fixed to said second member and engageable with a face of a work piece, which work piece is supported by said upstanding member and which face is substantially perpendicular to the axis of said upstanding member, and an indicator carried by said second member and having a movable anvil engageable with said work piece spaced from said first-mentioned anvil.

6. A gage having a threaded portion for supporting engagement with the threads of a work piece to be gaged, a member mounted for motion axially of said threaded portion, a gaging anvil fixed to said member for engagement with a face of a work piece so supported, said face being at least substantially perpendicular to said axis, said member being biased to cause said anvil to maintain engagement with said face as the work piece is turned about said axis to thereby determine the axial position of said member, an indicator fixed to said member, and an anvil movably carried by said indicator and biased to ride on said work face spaced from said fixed anvil.

7. A gage having means for engaging with a peripheraly grooved work piece for rotation about an axis, said engaging means being expansible and collapsible to facilitate placing and removal of such work piece, a pair of work gaging anvils engageable at points spaced angularly about said axis with a face of the work at substantially right angles to said axis, means for indicating, by relative motion of said anvils, variations from true right angular relationship between said work face and axis as said work piece is turned relative to said engaging means about said axis, and means for expanding and collapsing said engaging means.

8. A device of the class described, comprising an upstanding member having parts movable relative to each other to engage or release a work piece having peripheral grooves in which said parts may engage for supporting engagement of the work piece, a support for said member, a post carried by said support spaced from said upstanding member, an arm carried on said post, a second member, parallel motion mechanism connecting said second member to said arm for motion substantially parallel to the axis of said post, an anvil fixed to said second member and engageable with a face of a work piece, which work piece is supported by said upstanding member and which face is substantially perpendicular to the axis of said upstanding member, and an indicator carried by said second member and having a movable anvil engageable with said work piece spaced from said first-mentioned anvil.

9. A gage having means comprising a plurality of parts relativley movable to engage or release a work piece having peripheral grooves in which said parts may engage and when so engaged supporting said work piece for rotation about an axis, a pair of work gaging anvils engageable at points spaced angularly about said axis with a face of the work at substantially right angles to said axis, and means for indicating, by relative motion of said anvils, variations from true right angular relationship between said work face and axis as said work piece is turned relative to said engaging means about said axis.

WILLIS F. MOORE.

REFERENCES CITED

The following references are of record in the file of this patent:

UNITED STATES PATENTS

| Number | Name | Date |
| --- | --- | --- |
| 1,436,354 | Parker | Nov. 21, 1922 |
| 1,241,469 | Payne | Sept. 25, 1917 |
| 1,317,459 | Rouanet | Sept. 30, 1919 |
| 2,363,077 | Moore | Nov. 21, 1944 |